Jan. 19, 1943.  A. C. GARDOCKI, JR  2,308,748
STABILIZER FOR INDEPENDENT FRONT WHEEL SUSPENSION ASSEMBLY
Filed May 28, 1941  2 Sheets-Sheet 2
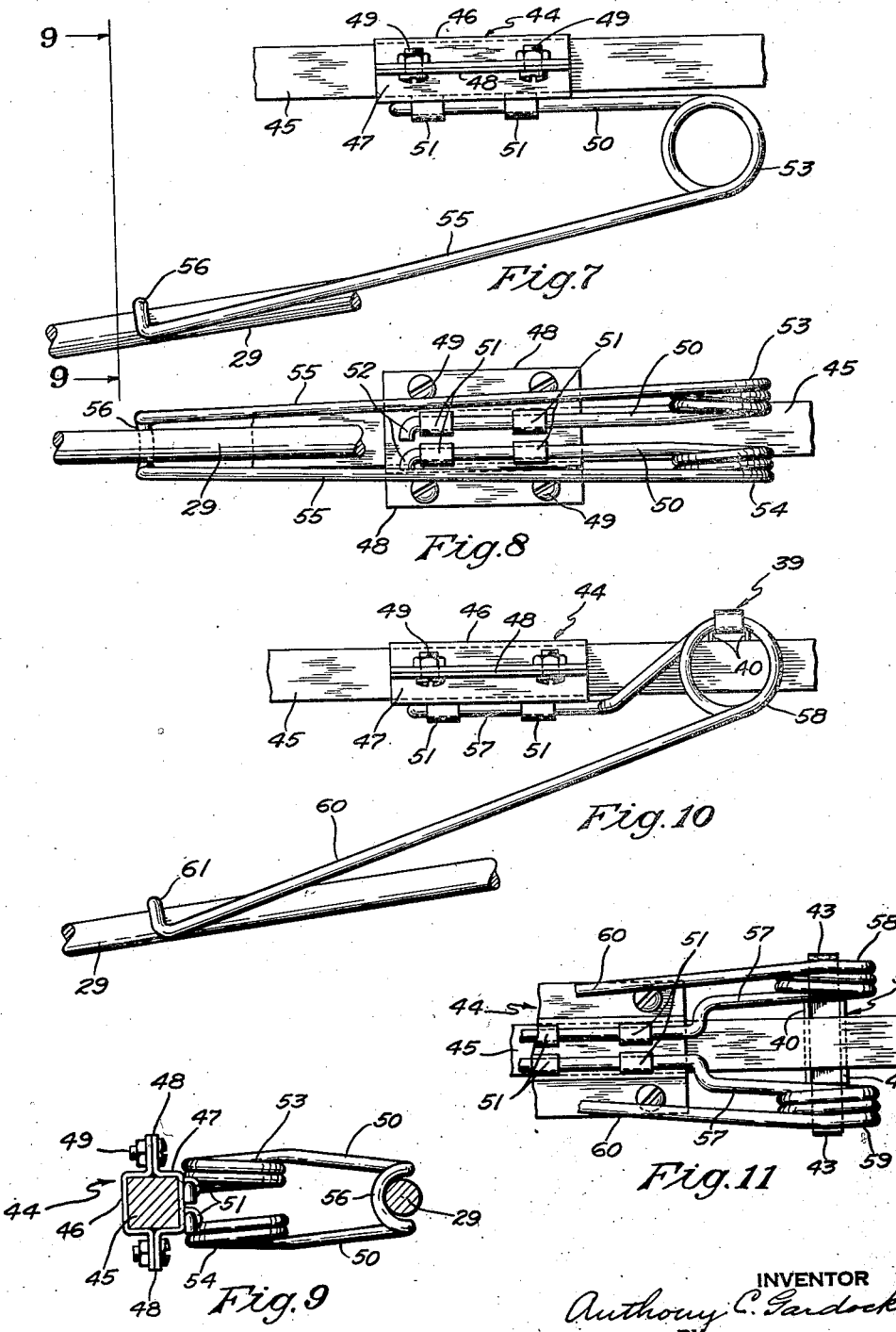
INVENTOR
Anthony C. Gardocki Jr
BY
Wooster Davis
ATTORNEYS Patented Jan. 19, 1943

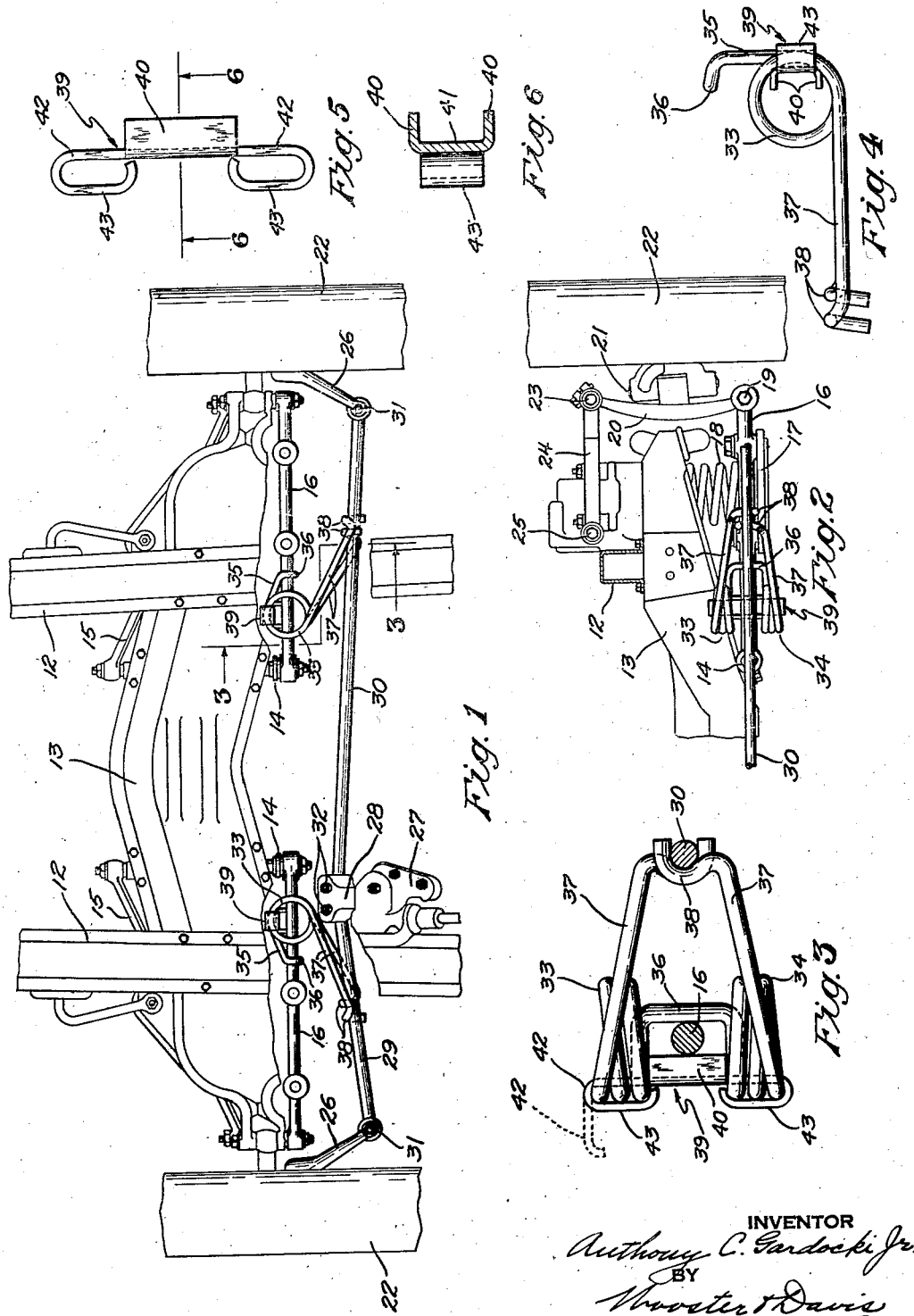

2,308,748

UNITED STATES PATENT OFFICE 2,308,748

STABILIZER FOR INDEPENDENT FRONT WHEEL SUSPENSION ASSEMBLY

Anthony C. Gardocki, Jr., Milford, Conn.

Application May 28, 1941, Serial No. 395,527

6 Claims. (Cl. 280—89)

This invention relates to a stabilizer for independent front wheel suspension assemblies for motor vehicles, and particularly to a device for eliminating shimmy or other objectionable effect caused by wear and the resulting looseness in the tie rod connections of the steering mechanism.

In these assemblies and the associated steering mechanism shimmy may be caused in the front wheels by loose bearings or connections caused by wear, particularly in the connections at the ends of the tie rods of the steering mechanism leading from the steering column to the individual wheels. Usually at the connections at the ends of the tie rods are ball and socket joint assemblies, and these wear in time and cause free play of the tie rods which is transmitted to the wheels. When this happens the wheels automatically lose their proper toe-in, and the wheels being independent of each other will not respond to the irregularities of the road in the same manner as they should. When each wheel tries to pull or roam in its own direction the tie rods receive individual shocks or jerks from each wheel causing the tie rods to vibrate excessively and that causes more wear on the ball and socket joints. These individual shocks or jerks travel throughout the whole steering assembly and may cause the driver to lose control of the vehicle. These individual shocks or jerks are reversed and cause the wheels to vibrate or shimmy.

It is therefore an object of the invention to eliminate this vibration or shimmy. It is also an object to provide a device or stabilizer which may be easily applied to the steering and front wheel assemblies, and which applies pressure and stops them from vibrating, and cushions and dampens shocks or jerks that are transmitted to them from each wheel so that they will be rendered harmless.

With the foregoing and other objects in view I have devised the construction illustrated in the accompanying drawings forming a part of this specification. It is however to be understood that I am not limited to the use of the specific construction and arrangement shown, but may employ various changes and modifications within the scope of the invention.

In these drawings:

Fig. 1 is a top plan view of a portion of the front wheel suspension assembly for a motor vehicle showing one form of my improved stabilizer applied thereto;

Fig. 2 is the rear elevation of the right hand portion thereof looking toward the bottom of Fig. 1;

Fig. 3 is a detailed section on an enlarged scale substantially on line 3—3 of Fig. 1 showing the stabilizer in elevation;

Fig. 4 is a top plan view of the stabilizer removed from the vehicle and showing it in the untensioned condition;

Fig. 5 is a side elevation of the fulcrum clip used in mounting the stabilizer;

Fig. 6 is a transverse section thereof substantially on line 6—6 of Fig. 5;

Fig. 7 is a top plan view showing a stabilizer of a slightly modified construction in position in the suspension and steering assemblies;

Fig. 8 is a rear elevation looking toward the bottom of Fig. 7;

Fig. 9 is a section substantially on line 9—9 of Fig. 7;

Fig. 10 is a plan view similar to Fig. 7 showing another slight modification; and Fig. 11 is a rear elevation of the right hand portion of Fig. 10 looking toward the bottom of Fig. 10.

Referring first to the arrangement of Figs. 1 to 6, side members of the frame of the motor vehicle are indicated at 12, connected and supported by the cross member 13, to the underside of which is pivoted at 14 the lower frame of the individual wheel assembly, comprising the front arms 15 and rear or bottom arm or rod 16 which support the platform 17 on which the coil spring 18 is mounted and which supports the cross member 13 and the frame and body of the vehicle. Pivoted to the outer end of this frame at 19 is the upright 20 on which is mounted the king pin assembly 21 for the front wheel 22, the upper end 23 being pivoted to the link assembly 24 pivoted to the frame at 25 keeping the parts in proper alignment. The steering arm leading rearwardly and inwardly from the front wheel support is indicated at 26. The lower end assembly of the steering column is indicated at 27 from which projects the movable arm 28 swung from side to side by turning of the steering wheel in the steering operation, and from which lead the tie rods 29 and 30 connected to the steering arms 26 of the front wheels. The opposite ends of these tie rods are connected to the arms 26 and the swinging arm 28 by the ball and socket joint assemblies 31 and 32.

In operation the frame comprising the arms or rods 15 and 16 rises and falls by swinging about the pivot 14 as the wheels suspended thereby move over irregularities in the road, and the ball and socket joints 31 and 32 become worn and therefore loose to cause free play of the tie rods, and this free play is transmitted to the wheels. When this happens the wheels automatically lose their proper toe-in, and the wheels being independent of each other will not respond to the irregularities of the road as they should. Each wheel tries to pull or roam in its own direction, and this causes the tie rods to receive shocks or jerks from the wheels, causing the tie rods to vibrate excessively, and that causes more wear on the ball and socket joints. These individual shocks or jerks travel throughout the whole steering assembly, and may cause the driver to lose control of the vehicle. These individual shocks or jerks are also reversed and cause the wheels to vibrate or shimmy, thus increasing wear not only on the various connections, but also on the tires, and making the vehicle difficult to handle.

To overcome and prevent these effects as the result of wear in the tie rod connections I place a stabilizer between the rear control arm or rod 16, commonly called the lower control arm, and the tie rod either 29 or 30 to the rear thereof, which comprises a spring of a novel construction. This spring has arms which react between the rod 16 and the adjacent tie rod to exert lateral pressure thereon so that this pressure applied to the tie rods stops them from vibrating, and any such shocks or jerks that are transmitted to them from each wheel are cushioned to such an extent that they are rendered harmless. This spring or stabilizer is of simple construction and may be readily and quickly applied, but does not interfere with the proper movement of the tie rods to interfere with the proper steering operation.

This spring as shown in Figs. 1 to 4 preferably comprises two coils or loops 33 and 34 which may comprise any desired number of convolutions. Extending from one end of each coil or loop, in the present case the inner end, is an extension 35 comprising one side of an arm, the ends being connected by the loop 36. From the other end of each coil extends an arm 37 bent at their free ends to form a recess 38 to receive one of the rods of the assembly. When the spring is untensioned the arms 35 and 37, as shown in Fig. 4, are at substantially right angles or at any other angle to each other greater than their relative angle when they are in position between the tie rod and the individual wheel suspension, so that when they are applied to this position the arms must be swung toward each other to tension the spring and to give it the proper tension so that it will exert the proper pressure on the tie rod. The arm 35 is ordinarily shorter than the arms 37 although not necessarily so, their lengths being controlled to a large extent by the space available for their use.

The spring is fulcrumed and supported on a fulcrum clip 39. This may be of various shapes, but that shown is made of rather heavy gauge sheet metal of U-shape cross section to give it strength and stiffness. The central U-shaped portion including the side flanges 40 extends between the coils 33 and 34 as shown in Figs. 2 and 3, and the connecting portion 41 is extended from the opposite ends thereof to form the extensions 42 which when placed in position on the spring are bent around the coils 33 and 34 as shown in Fig. 3 to fasten the clip to these coils. When placed in position on the car the edges of the flanges 40 rest against one of the arms or rods 16 of the wheel suspension or the tie rods 29 or 30. In the drawing it is shown as against the arm or rod 16 with the coils 33 and 34 located one above and the other below the rod. The arm 35 of the spring extends from this clip around the rod 16 and the other arms 37 extend to the tie rod 29 and 30. Thus the clip 39 forms a fulcrum support for the spring and forms a fulcrum for proper tensioning of the spring.

In the modification shown in Figs. 7 and 8 the spring is substantially the same as that of Figs. 1 to 4, but it is mounted in the assembly by a slightly different means. In this arrangement a clip or clamp 44 takes the place of clip 39 and is clamped about the bottom or rear control arm or rod 45 of the individual wheel suspension, corresponding to the arm or rod 16 of Figs. 1, 2 and 3. This clamp or clip may be of different construction but is shown as comprising two members 46 and 47 shaped to embrace the arm or rod 45. They have flanges 48 by means of which they may be clamped about the rod by any suitable means such as the screws 49. The arms 50 of the spring are secured to this clamp. In the arrangement shown ears 51 are cut and pressed outwardly from the side wall of the member 47 to form loops through which the arms 50 are inserted, and then the free ends are bent laterally as shown at 52 to prevent their pulling out. The intermediate portions of the spring are wound to form the coils 53 and 54 corresponding to the coils 33 and 34 of the first form, and the other ends of these coils are extended laterally to form the portions 55 of an arm to engage the other rod of the assembly. In this arrangement the tie rods 29 and the ends of the sides 55 are connected by a loop 56 embracing this rod. When untensioned the arms of the spring are arranged approximately as shown in Fig. 4 or any other desired angle, but must be brought toward each other when placed in position in the assembly to give the proper tension to the spring.

In the form shown in Figs. 10 and 11 the same clip or clamp 44 is used to fasten the free ends of the arms 57 to the arm or rod 45, but this is combined with the fulcrum clip 39 the same as the fulcrum clip used in Figs. 1 to 5. This clip extends between the coils 58 and 59 of the spring and has the loops 43 at its ends embracing the coils 58 and 59 the same as is shown in Fig. 3. The other ends of the coils 58 and 59 are extended to form the arms 60 having the loop 61 connecting their free end and embracing the tie rod 29. The clamp and clip 44 and 39 may be on either rod 45 or 29, but are preferably on the rod 45 as it is preferred the sliding action be on the tie rod of the steering mechanism as there is more movement of the rod, and there is better sliding action between the arms of the spring and this rod.

It will be seen that in all forms the spring is mounted so that it will not get out of place, but no change is required in the suspension assembly or the steering mechanism. Also that the clamp and the fulcrum clip hold the spring in proper position and provide the proper fulcrum for tensioning the spring to give the proper reaction between the suspension assembly and the tie rod, to thus give the proper pressure on the tie rod to prevent it from vibrating. As it maintains the ball and socket joints at the ends of the tie rods in effect tight to compensate for wear in these joints, it keeps the wheels in the proper position, maintaining their proper toe-in and causing them to respond in the proper manner to irregularities in the rod, and preventing vibration or shimmy of the wheels.

When applied to a new car these stabilizers by holding the tie rods tight reduce wear on the steering assembly connections.

Having thus set forth the nature of my invention, what I claim is:

1. In a device of the character described, in combination with an individual front wheel suspension pivoted for up and down movement including a lower control rod, a wheel pivotally mounted on said suspension, and the tie rod of the steering mechanism leading to said wheel, of a spring having a pair of laterally spaced coils, an arm extending laterally from one end of each of said coils and connected at their free ends to form a loop, an arm extending laterally from the other end of each of the coils, said first and second arms reacting between the lower control rod and the tie rod with the loop engaging one of the rods to exert pressure thereon, said loop being turnable on the rod, and a clip including means to embrace the spring to secure it to said spring and mounting the spring on one of said rods.

2. In a device of the character described, a spring having a pair of coils, an arm extending laterally from one end of each of said coils and connected at their free ends to form a loop, an arm extending laterally from the other end of each of the coils, said first and second sets of arms adapted when the clip is in position to react between the lower control rod of an individual front wheel suspension and the tie rod of the steering mechanism leading to said wheel to exert lateral pressure thereon, and a fulcrum clip extending between the coils and having looped ends embracing the two coils to secure the clip to the spring, said clip being adapted to engage one of said rods with the coils on opposite sides thereof and form a fulcrum support for the spring.

3. In a device of the character described, a spring comprising a pair of spaced coils, extensions from one end of said coils forming arms adapted to engage the lower control rod of an individual front wheel suspension assembly, extensions from the other ends of the coils forming arms adapted to engage the tie rod of the steering mechanism leading to the wheel on said assembly, said arms being adapted to react between said rods to tension the spring and exert lateral pressure on the tie rod, a fulcrum clip extending between said coils and adapted to rest against said first rod, and loops on said clip embracing the coils to secure the clip thereto.

4. In a device of the character described, a spring comprising a pair of spaced coils, extensions from one end of said coils forming arms adapted to engage the lower control rod of an individual front wheel suspension assembly, extensions from the other ends of the coils forming arms adapted to engage the tie rod of the steering mechanism leading to the wheel on said assembly, said arms being adapted to react between said rods to tension the spring and exert lateral pressure on the tie rod, a fulcrum clip of substantially U-shape in cross section extending between said coils and having side flanges adapted to rest against one of the rods to form a fulcrum for the spring, and extensions on said clip embracing the coils to secure the spring to the clip.

5. In a device of the character described, in combination with an individual front wheel suspension pivoted for up and down movement including a lower control rod, a wheel pivotally mounted on said suspension, and the tie rod of the steering mechanism leading to said wheel, of a spring having coils and arms extending laterally from said coils reacting between the said lower control rod and the tie rod, said latter arm having a loop engaging the tie rod to turn about the rod with movement of the suspension, and a clamp secured to one of said arms and including means for clamping it on one of the said rods to mount the spring thereon.

6. In a device of the character described, a spring having coils and arms extending laterally from said coils adapted to react between the lower control rod of an individual front wheel assembly and the tie rod of the steering mechanism leading to the wheel on said assembly, a clamp rigidly secured to one of said arms and including means adapted for clamping it onto the first rod, a fulcrum clip extending between the coils and adapted to rest against said rod to form a fulcrum for the spring, and extensions on the clip embracing the coils to secure the clip thereto.

ANTHONY C. GARDOCKI, Jr.